Aug. 12, 1947.  E. F. SARVER  2,425,647
THERMOELECTRIC CURRENT GENERATING DEVICE
Filed April 15, 1943  2 Sheets-Sheet 1
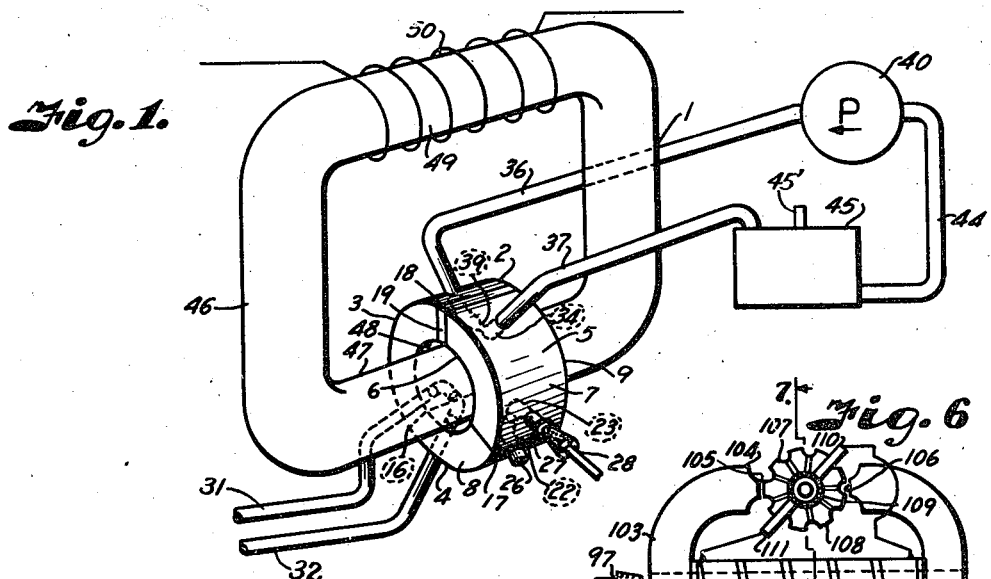
INVENTOR
Emmett F. Sarver
BY
Arthur C. Brown
ATTORNEY Aug. 12, 1947.  E. F. SARVER  2,425,647
THERMOELECTRIC CURRENT GENERATING DEVICE
Filed April 15, 1943  2 Sheets-Sheet 2
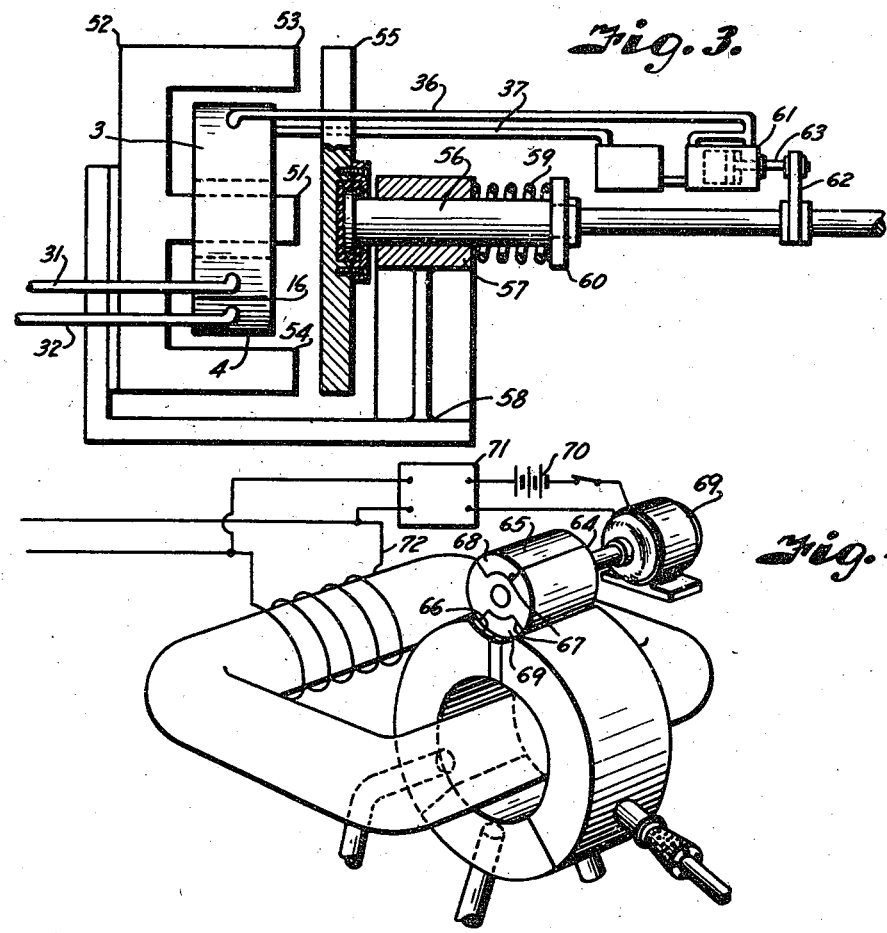
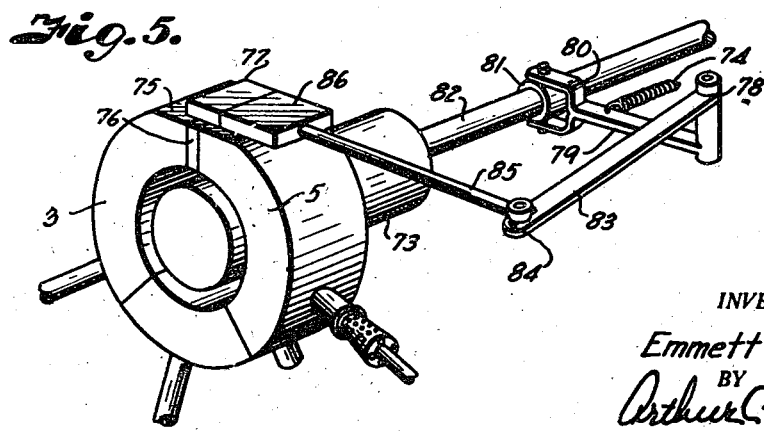
INVENTOR
Emmett F. Sarver
BY
ATTORNEY Patented Aug. 12, 1947

2,425,647

UNITED STATES PATENT OFFICE 2,425,647

THERMOELECTRIC CURRENT GENERATING DEVICE

Emmett F. Sarver, Wichita, Kans., assignor of one-half to O. W. Wortman, Wichita, Kans.

Application April 15, 1943, Serial No. 483,133

10 Claims. (Cl. 171—97)

This invention relates to electrical generators, particularly of a type which produces an electrical current directly from the action of heat applied to a thermo-electric couple. Devices of this character produce relatively high current values but the voltage is so low that they have not been put to practicable use.

It is therefore the principal object of the present invention to provide a thermo-electric couple capable of producing an electric current of sufficiently high voltage that it may be used as a source of electrical energy for actuating armatures, plungers and similar small equipment.

It is also an object of the invention to provide an efficient and simple arrangement for heating the hot junction of a thermo-couple and cooling the cold junction.

A further object of the invention is to provide a thermo-couple with current pulsating means to amplify the magnetic field affected by the couple.

In accomplishing these and other objects of the invention hereinafter pointed out, I have provided improved details of structure, the preferred forms of which are illustrated in the accompanying drawings wherein:

Fig. 1 is a perspective view, partly diagrammatical, of an apparatus constructed in accordance with the present invention.

Fig. 2 is an enlarged section through the thermo-electric couple of the apparatus, particularly illustrating means for pulsating flow of current that is generated thereby.

Fig. 3 is a side elevational view of a modified form of the invention, wherein the magnetic field of the thermo-couple is utilized to actuate an armature.

Fig. 4 is a perspective view of an apparatus similar to that illustrated in Fig. 1, but showing a modified form of current pulsating mechanism.

Fig. 5 is a perspective view of a further modified form of the invention, wherein the thermo-couple is utilized to reciprocate a plunger equipped with a modified form of current pulsating mechanism.

Fig. 6 is an elevational view of another form of the invention.

Fig. 7 is a sectional view on the line 7—7 Fig. 6.

Fig. 8 is a detail perspective view of the thermo-couple employed in Fig. 6.

Referring more in detail to the drawings:

1 designates a current generating apparatus which includes a thermo-electric couple 2 constructed of different metals or alloys. The respective metals composing the couple are in the form of arcuate segments 3, 4, and 5 which in the illustrated instance are of rectangular cross-section and have inner and outer arcuate faces 6 and 7, side faces 8 and 9 and end faces 10, 11, 12, 13, 14, and 15 respectively. The arms of the segments are of such a length that when the end faces 11 and 12 of the segments 3 and 4 and the end faces 13 and 14 of the segments 4 and 5 are in abutment and secured together as by welding to form junctions 16 and 17, a gap is produced between the end faces 10 and 15 of the segments 3 and 5. The gap 18 interrupts circuit through the couple and is closed by an insulating spacer 19 having side faces 20 and 21 sealed in an appropriate manner with the end faces 10 and 15 of the segments 3 and 5 to provide leak-proof joints therebetween. The spacer may be formed of porcelain, mica or other heat resistance non-conductive material having sufficient strength to assist in maintaining the cylindrical shape of the thermo-couple.

The segments 3 and 5 of the couple may be of like metals, such as copper, but the segment 4 is of a dissimilar metal, such as constantan, so that when a circuit is established through or across the insulating spacer 19, and the junction 16 is cooled while the junction 17 is heated, a current is caused to flow circumferentially of the couple to produce a magnetic field therearound.

In order to heat the junction 17, the adjacent ends of the segments 4 and 5 are provided with L shaped bores 22 and 23 interconnected at the junction 17 and having ends opening radially through the outer arcuate faces of the segments in internal threaded counterbores 24 and 25 and in which are mounted nipples 26 and 27. The nipple 27 is preferably flared at the outer end thereof to receive a flame from a burner 28 supported in a suitable manner (not shown) in such a manner that the flame plays through the passageway formed by the respective bores to heat the junction.

The junction 16 has similar bores 29 and 30 interconnected at the junction 16 and having ends connected with internally threaded counterbores formed in the outer faces of the segments 3 and 4 to connect supply and return pipes 31 and 32 for circulating a cooling medium through the passageway thus formed to cool the junction 16 materially below the temperature maintained at the junction 17. The cooling medium is preferably a non-conductor of electricity and may be one of the common liquid refrigeration gases arranged to expand within the passageway and absorb heat from the couple, or the cooling medium may be a refrigerated fluid circulated through the passageway.

It is thus obvious that the junctions 16 and 17 are maintained at widely different temperatures to produce a maximum current flow in the thermo couple when a circuit is closed through the insulating spacer 19 but the voltage is so low that the current is of little or no practical use. I therefore contemplate use of the thermo couple as the primary of a transformer shown in Figure 1 and provide a mechanism for intermittently pulsating flow of current generated in the thermo couple to alternately create and destroy the magnetic field thereof so as to induce an electro motive force within the secondary of the transformer of sufficiently high voltage to operate armatures, plungers and the like.

In order to obtain the necessary current pulsations within the thermo couple, I provide a mechanism for intermittently opening and closing an electrical connection across the gap of the thermo couple.

In the form of the invention illustrated in Figures 1, 2 and 3, the adjacent ends of the segments 3 and 5 including the insulating spacer 19 are bored to provide a passageway 34 therethrough having its ends opening into threaded counterbores 35 formed in the outer arcuate faces 7 of the segments to connect nonelectrical ducts 36 and 37 through which slugs of conductive fluid such as mercury 38 are caused to move in spaced succession to bridge the gap between the segments 3 and 5 and momentarily form a conductor for completing circuit of the thermo couple at the time the ends of the slug simultaneously contact the segments 3 and 5 on the respective sides of the insulating spacer. In order to assure positive electrical contact of the slugs, the passageway is provided with restriction 39 adjacent the insulating spacer.

The slugs 38 may be effected by means of a pump 40 connected with the duct 36 and which has a cylinder 41 containing a piston 42 adapted to be reciprocated by a crank 43 actuated by any suitable source of power. The pump is preferably of a double acting type so as to expel slugs of mercury at one end of the cylinder and compressed air at the other to maintain spacing of the slugs in the duct 36. The mercury is supplied to the pump through a duct 44 having connection with a supply vessel 45 which is suitably vented to atmosphere through an opening 45'. After passing through the passageway of the thermo couple, the mercury in slug form is then returned to the vessel 45 for re-circulation to the pump through a pipe 44. On return to the vessel the mercury flows to the bottom thereof from where it is removed by the pump. The air separates in the vessel and is discharged through the vent 45'. With this arrangement, it is obvious that the frequency of pulsations may be regulated by varying the speed of the pump which controls the formation of the slugs 38 and rapidity at which the slugs are moved through the passageway of the thermo couple to make and break the circuit for effecting the desired induced electro motive force in the secondary of the transformer.

In Figure 1 the transformer is shown as including a closed core 46 having one side 47 passing through the opening 48 of the thermo couple and the other side 49 mounting a secondary winding 50.

The operation of the structure described in Figs. 1 and 2 is as follows:

The pipes 31 and 32 are connected with a source for supplying a cooling medium so that the cooling medium on flowing through the bores 29 and 30 cool the junction 16 and maintain it at a temperature differential from the temperature of the junction 17. The burner 28 is lighted so as to discharge heat through the bores 22 and 23 to heat the junction 17. Differential in temperatures between the respective junctions induces flow of current through the couple whenever a circuit is closed across the faces 20 and 21 of the segments 3 and 5. To effect intermittent closure of the circuit, the crank 43 is actuated to reciprocate the piston 42 which draws mercury from the vessel 45 through the pipe 44 when the piston moves in one direction and discharges it through the pipe 36 when the piston moves in the opposite direction. Simultaneously air is drawn into the opposite end of the cylinder and discharged by the piston into the pipe 36 with the mercury being discharged alternately with the air so that the mercury is in the form of slugs with the slugs separated by air so that when a slug of mercury passes through the opening in the spacer 19 the circuit is closed between the segments 3 and 5. After the slug has passed through the spacer the circuit is broken by reason of the following charge of air. After passing through the spacer the alternating slugs of air and mercury are delivered through the pipe 37 to the vessel 45. In the vessel 45 the mercury and air separate, with the mercury flowing to the bottom of the vessel for return to the pump through the pipe 44 and the air rising from the vessel for discharge through the vent 45'. An intermittent flow of current is thus effected in the thermocouple so that a current is introduced in the secondary winding of the transformer.

In Figure 3 I have shown a slightly modified form of arrangement in which the thermo couple is mounted upon the central pole 51 of a substantially E shaped magnet 52 having the opposite poles 53 and 54 cooperating with the pole 51 to attract and repel a plate type armature 55 that is magnetically insulated from a supporting shaft 56 reciprocable within a bearing 57 on a frame 58 which supports the magnet 52. The shaft is preferably provided with a coil spring 59 having one end engaging against the bearing and its opposite end against a collar 60 on the shaft. The free end of the shaft 56 may be connected with any mechanism which is desired to be actuated by the armature.

In this form of the invention, the pump 61 is of the same construction as the pump illustrated in Fig. 2 and operates in the same manner to supply slugs to the thermo couple. However the pump is actuated by an arm 62 fixed on the reciprocating shaft and having connection with the piston rod 63 of the pump. The thermo couple of this mechanism is of the same construction and functions in the same manner as that illustrated in Figures 1 and 2.

Assuming that the parts of the modified form of structure shown in Fig. 3 are constructed and assembled as described and that the thermo couple 3 is operating in the same manner as the thermo couple just described, a current is generated to energize the magnet 52 so that the armature 55 is attracted by poles of the magnet against action of the spring 59 whenever the circuit is closed by a slug of mercury discharged by the pump 61. This movement of the armature effects reciprocation of the shaft 56 in one direction and the pump piston is operated in the same direction by reason of its connection with the arm 62 and piston rod 63. As soon as the slug passes the insulating spacer of the thermo couple the circuit is broken. The spring 59 then comes into play and shifts the rod 56 in the opposite direction to reverse movement of the piston. With alternate flow of slugs of mercury and air through the thermo couple the reciprocatory action may be made continuous.

In Figure 4, I have illustrated another form of transformer wherein the thermo couple is equipped with a modified form of current pulsating mechanism. This mechanism includes a rotatable contactor 64 formed of insulating material and having cylindrical shape so that the circumferential face 65 thereof rides in wiping contact with the grooved ends 66 of the segments 3 and 5 of the thermo couple. The opposite diametrical faces of the commutator are provided with grooves 67 in which are mounted arcuate contact plates 68, 69 each having sufficient width to bridge the insulating spacer when they pass thereover for closing circuit through the thermo couple. The contact plates 68 and 69 are spaced apart so that the intermediate insulating surface of the contactor breaks the circuit incidental to rotation thereof. The contactor is rotated by any suitable means; for example, a motor 69 which is supplied with current from a storage battery 70 charged through a suitable charger 71 connected with the output circuit 72 of the secondary of the transformer.

The thermo couple and transformer elements of the apparatus shown in Fig. 4 operate in the same manner as the corresponding parts of the apparatus as previously described. The circuit in the thermo couple is intermittently opened and closed by energizing the motor 69 which in turn rotates the contactor 64. As the contactor rotates the contacts 65 and the insulated spaces therebetween successively pass over the ends of the segments of the thermo couple to alternately close and break the circuit.

In the form of the invention illustrated in Figure 5, the thermo couple is used in connection with a magnet core 73 which is reciprocable through the thermo couple responsive to the magnet field of the couple and a spring 74. In this form of the invention, the ends of the segments 3 and 5 are flattened as at 75 on the respective sides of the insulating spacer 76 to mount a slide 77 that is to be reciprocated across the insulating spacer to effect pulsation of current generated in the thermo couple. The slide 77 is actuated by a bell crank 78 having one arm 79 provided with a yoke 80 which is pivotally connected with a collar 81 on the rod 82 of the magnet. The other arm 83 of the bell crank is connected by a pin and slot connection 84 with a stem 85 connected with the slide 77. The slide includes a contact plate 86 of sufficient width to bridge the gap between the segments for establishing a flow of current as the plate portion moves thereacross. The bell crank including the rod of the magnet may be supported in any suitable manner from the frame which supports the thermo couple.

The operation of the apparatus illustrated in Fig. 5 is as follows:

The thermo couple operates in the same manner as the thermo couple previously described, the difference being in the method of opening and closing the thermo couple circuit. With the thermo couple in operation current is effected in the couple to energize the magnet 73 which draws the rod 82 in one direction, which movement of the rod swings the bell crank 78 and causes the arm 83 to reciprocate the rod 85, thereby moving the slide across the insulating spacer 76 so that the contact plate is alternately moved into and out of bridging relation with the terminals of the segments on the respective side of the insulating spacer. When the contact 86 has moved across the insulating spacer the circuit is broken and the spring 74 is effective to return the rod 82 to its original position. On the return stroke the contact 86 again moves across the insulating spacer to again energize the magnet core 73.

Figures 6, 7 and 8 disclose a structure employing a plurality of couples connected in pairs to increase the voltage of the current flowing through the interrupter so that the resistance of the interrupter would be less critical. The pairs of connected couples also provide a longer path of travel and increased efficiency of the junction tempering mediums. In this form of invention each couple 87 is composed of one flight of a helix 88 and each flight is composed of a pair of segments 89 and 90 having the ends thereof connected in any suitable manner, to provide junctions 91 and 92. Formed in the helix on the respective sides of the junctions 91 and 92 are bores 93—94 and 95—96 respectively. Suitably supported at the ends of the bores 93 and 94 is a burner 97 for directing a flame therethrough to heat the junction 91. Connected with the respective ends of bores 95 and 96 by manifolds (not shown) are supply and return pipes 98 and 99 whereby a cooling medium is circulated on the respective sides of the junction 92 to maintain that junction at considerably lower temperature than the junction 91. The respective couples are insulated on the adjacent face sides thereof by suitable insulation 11 and the ends are series connected. When the junctions are heated and cooled, a current is caused to flow spirally of the helix. Extending axially through the opening 101 of the helix is a leg 102 of a magnet 103 having pole pieces 104 extending upwardly of the ends of the helix and terminating over the helix in spaced pole faces 105 and 106.

Rotatably mounted between the pole faces in suitable bearings (not shown) is an armature 107 having a plurality of magnetizable segments 108 adapted to be attracted and repelled by the respective pole faces. The pole faces are shown as diametrically opposed and the segment faces are so spaced that when the face of one segment registers with the face of one pole a space is in registry with the other pole face so that the poles are alternatively effective on the armature to produce rotation thereof. Also formed as a part of the armature 107 is a commutator 109 having brushes 110 and 111 adapted to interconnect the endmost helixes to form a loop circuit for flow of the electrical current generated in the thermo couples when the brush 110 engages a commutator segment that is connected with a commutator segment engaged by the brush 111 and to break the circuit when the commutator has moved sufficiently to bring insulated portions thereof into contact with the brushes 110 and 111. This arrangement provides for pulsation in the current flow through the thermo couples. Fluctuation in the fields of the poles produces a continuous rotation of the armature 107 to actuate a shaft 112 that is connected therewith.

The operation of the form of the invention shown in Fig. 6 is as follows:

Assuming that a cooling medium is circulated through the pipes 98 and 99 and that the burner is in operation to heat the bore through the opposite side of the thermo couples, a current will be set up within the thermo couples to cause energization of the magnet poles 104. Energization of the magnets causes one of the magnets to attract the segments 108 and the other to repel, thereby rotating the armature 107. Rotation of the armature actuates the shaft 112 and causes rotation of the commutator 109 so that the circuit in the thermo couple is automatically opened and closed to establish a pulsating current.

From the foregoing it is obvious that I have provided an apparatus for generating electric currents in usable amounts by means of thermo electric couples. It is also obvious that I have provided a simple couple structure designed for efficient heating and cooling of the hot and cold junctions thereof.

What I claim and desire to secure by Letters Patent is:

1. A device of the character described including, a thermo couple forming a primary of a transformer, a secondary in inductive relation with the thermo couple, and means for pulsating current flow in the thermo couple to induce current flow in the secondary.

2. A device of the character described including, a substantially circular thermo couple, a magnetic core extending through the couple, an armature supported within the field of said core, and means for pulsating current generated in said thermo couple to effect actuation of the armature.

3. A device of the character described including, a substantially circular thermo couple, a magnetic core extending through the couple, an armature supported within the field of said core, means for pulsating current generated in said thermo couple to effect actuation of the armature, and an operative connection between the armature and said core to actuate the pulsating means responsive to movement of the armature.

4. In apparatus of the character described, a thermo-couple composed of segments having ends in abutting contact to form hot and cold junctions and having ends spaced apart intermediate said junctions, and a contact member having sliding contact with said segments for movement across said spaced ends to close circuit between said segments.

5. An apparatus of the character described including, a thermo-couple composed of segments having ends in abutting contact to form hot and cold junctions and having ends spaced apart intermediate said junctions, a contact member having sliding support on said segments for movement across said space to close circuit between said segments, an armature having reciprocable support relatively to the thermo-couple and an operating connection between said armature and the contact member to effect movement of the contact member responsive to actuation of the armature under influence of a magnetic field surrounding the couple, means for heating the hot junction, and means for cooling the cold junction to effect flow of current in the couple when the contact member is bridging said space between the segments.

6. A device of the character described including a plurality of series connected thermo-couples, insulating means between said couples, a core extending through said couples, poles at the ends of said core and having spaced pole faces, an armature mounted for rotation between the pole faces, a commutator carried for rotation with the armature, and means connecting the commutator with the endmost couples in said series.

7. A thermo-couple including a plurality of segments having ends in abutting engagement to form a circuit interrupting junction and separate hot and cold junctions, said hot and cold junctions being at opposite ends of one of the segments, means for heating the hot junction, means for cooling the cold junction, and means for intermittently opening and closing circuit through said circuit interrupting junction.

8. In an apparatus of the character described, a thermo-couple composed of segments having ends in abutting contact to form hot and cold junctions and having ends spaced apart intermediate said junctions, and contact means movable across said spaced apart ends for intermittently closing circuit between said segments.

9. In an apparatus of the character described, a thermo-couple composed of segments having ends in abutting contact to form hot and cold junctions and having ends spaced apart intermediate said junctions, insulation closing the space between said spaced apart ends, said spaced apart ends and insulation having a passageway for a circuit closing fluid, and means for intermittently delivering slugs of said fluid through the passageway to close circuit between said segments.

10. In an apparatus of the character described, a thermo-couple composed of segments having ends in abutting contact to form hot and cold junctions and having ends spaced apart intermediate said junctions, insulation closing the space between said spaced apart ends, said spaced apart ends and insulation having a passageway for a circuit closing fluid, means for intermittently delivering slugs of said fluid through the passageway to close circuit between said segments, and a restriction in the passageway on the discharge side of the insulation.

EMMETT F. SARVER.

REFERENCES CITED

The following references are of record in the file of this patent:

UNITED STATES PATENTS

| Number | Name | Date |
| --- | --- | --- |
| 1,893,748 | Klopsteg | Jan. 10, 1933 |
| 2,114,298 | Gunn | Apr. 19, 1938 |
| 2,113,164 | Williams | Apr. 5, 1938 |
| 2,203,689 | Macdonald | June 11, 1940 |
| 2,302,049 | Parker | Nov. 17, 1942 |
| 1,118,269 | Creveling | Nov. 24, 1914 |
| 407,762 | Acheson | July 30, 1889 |
| 407,763 | Acheson | July 30, 1889 |
| 1,643,734 | Zworykin | Sept. 27, 1927 |